United States Patent [19]
Elkins

[11] 3,972,215
[45] Aug. 3, 1976

[54] APPARATUS FOR CUTTING A CURVED EDGE ON A METAL STRIP HAVING SURFACES IN MORE THAN ONE PLANE

[76] Inventor: Gene C. Elkins, 2940 Patio Drive, Houston, Tex. 77017

[22] Filed: Feb. 28, 1975

[21] Appl. No.: 554,163

[52] U.S. Cl. .................................. 72/326; 72/332; 72/338; 83/49; 83/519; 83/683
[51] Int. Cl.² ......................................... B21D 31/02
[58] Field of Search ............ 72/326, 332, 338, 339, 72/324; 140/93.4; 83/49, 519, 683, 917; 269/111, 115, 116, 126, 196, 201, 216, 217, 218

[56] References Cited
UNITED STATES PATENTS

| 528,738 | 11/1894 | Pfouts | 83/519 X |
|---|---|---|---|
| 2,032,535 | 3/1936 | Geist | 269/218 |
| 2,428,742 | 10/1947 | Rothe | 83/917 X |
| 3,559,521 | 2/1971 | Kubala | 83/519 X |
| 3,650,301 | 3/1972 | Karass | 140/93.4 |

FOREIGN PATENTS OR APPLICATIONS

| 126,537 | 5/1919 | United Kingdom | 83/917 |

Primary Examiner—Milton S. Mehr
Assistant Examiner—James R. Duzan
Attorney, Agent, or Firm—Jack W. Hayden

[57] ABSTRACT

A support means is provided with a pair of fixed dies aligned in spaced, horizontal relationship for receiving a metal strip having a base portion with edge portions extending in planes different from that of the base portion to be cut. Cutting die means are movably carried by the support means with actuating means connected to the movable die means for cutting the base portion and the edge portion of the metal strip supported on the spaced fixed dies with the cutting dies being shaped so that the angle cut on the base portion by the cutting die means is different from the angle cut by the cutting die means on the edge portions of the metal strip.

1 Claim, 7 Drawing Figures

APPARATUS FOR CUTTING A CURVED EDGE ON A METAL STRIP HAVING SURFACES IN MORE THAN ONE PLANE

SUMMARY OF THE INVENTION

Means are presently employed for cutting metal strips having a base portion with edge portions extending in different planes from the edge portions, but in such prior arrangements known to applicant, the die means is employed to initially cut either the edge portions or the base portion of the metal strip. Thereafter the metal strip must be visually and manually aligned with other cutting dies and an attempt is then made to cut the remaining surface of the metal strip so that a smooth continuous cut is formed along the base portion and edge portions of the metal strip.

Such practice is not only time consuming, but it is difficult to align the die means relative to the movable strip after the initial cut has been made so that it is not always possible to properly align the die means for the second pass on the metal strip to form a smooth continuous edge on the bottom and edge portions of the metal strip.

The present invention overcomes this and other problems of prior arrangements in that it provides a fixed die means for supporting the base portion and edge portions of a metal strip, which edge portions extend from the base portion of the metal strip in planes different from that of the base portion. The support means also carries cutting die means movably mounted thereon with actuating means connected to the movably mounted cutting die means so that when the actuating means is actuated, the edge portions of the metal strip are cut by the die means then the actuating means is then moved so as to cut the base portion of the metal strip. Since such operation is carried out in one pass without moving the metal strip and without requiring any further alignment of the dies or the metal strip after the metal strip has once been positioned on the fixed die means carried on the support means so that a continuous, smooth cut is formed on the metal strip in a desired manner.

Other objects and advantages of the present invention will become more readily apparent from a consideration of the following description and drawings.

DESCRIPTION OF THE PREFERRED EMBODIMENT

Figure 6:
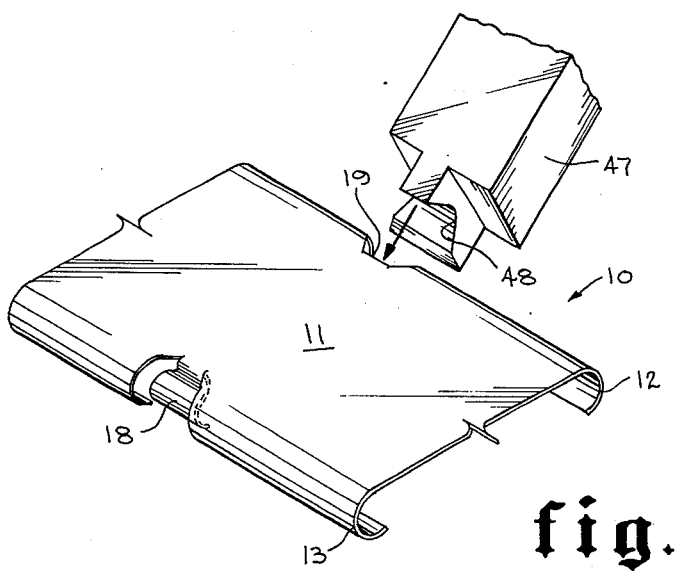
FIG. 6 is a perspective view showing a metal strip of a form on which the present invention is employed and diagrammatically illustrates the movement of the edge portion cutting die means for cutting a surface on the edge portions of the metal strip.

Attention is first directed to FIG. 6 of the drawings wherein a metal strip is referred to generally by the numeral 10. The metal strip includes a base portion 11 which extends in one plane with edge portions 12 and 13 extending in multiple planes different from that of the plane of the base portion 11. As illustrated, the edge portions 12 and 13 are generally arcuate and extend generally downward and then back toward each other in a spaced relation to the base portion 11 of the metal strip as illustrated.

Figure 7:
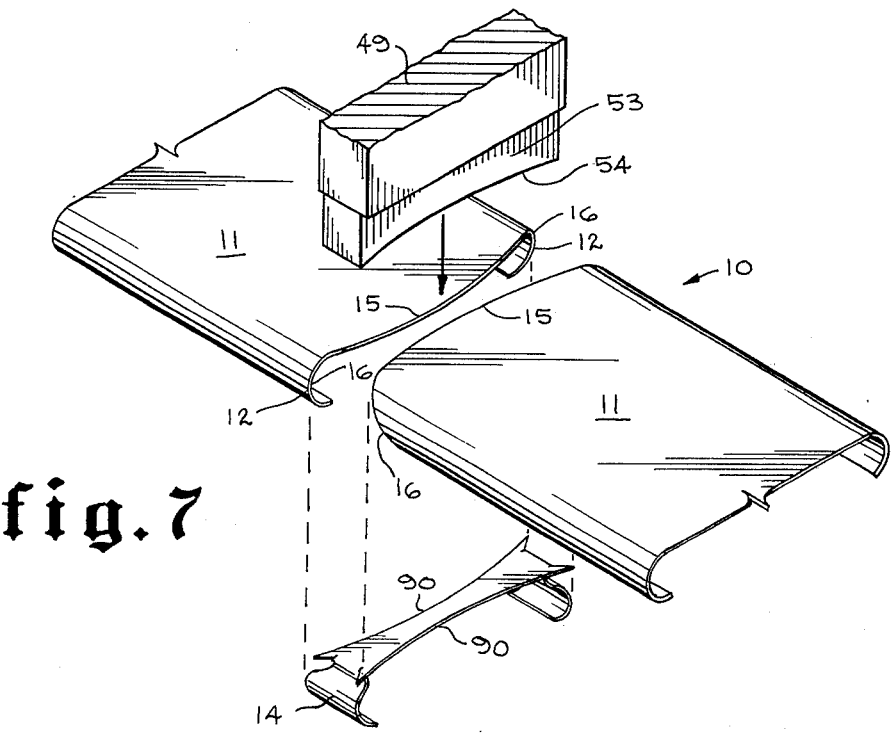
FIG. 7 is a perspective view similar to FIG. 6 and shows the base portion cutting die means as having moved to cut the base portion of the metal strip with the metal blank which results from such cutting operation and the continuous curved edge formed on the metal strip.

In FIG. 7 the metal strip 10 is again referred to and it will be noted that it has been cut so that a generally convex edge or surface 15 is formed on the base portions 11 whereas the angle cut on the edge portions 12 and 13 generally recedes relative to the angle on the edge or cut 15, such receding angle being represented at 16. Generally speaking, if the metal strip 10 illustrated in FIGS. 6 and 7 were flattened, the angle formed at 16 on the edge portions 12 and 13 would, along with the edge 15 formed on the base portion 11, form a continuous generally smooth arcuate convex curve on the flattened metal strip 10.

Figure 1:
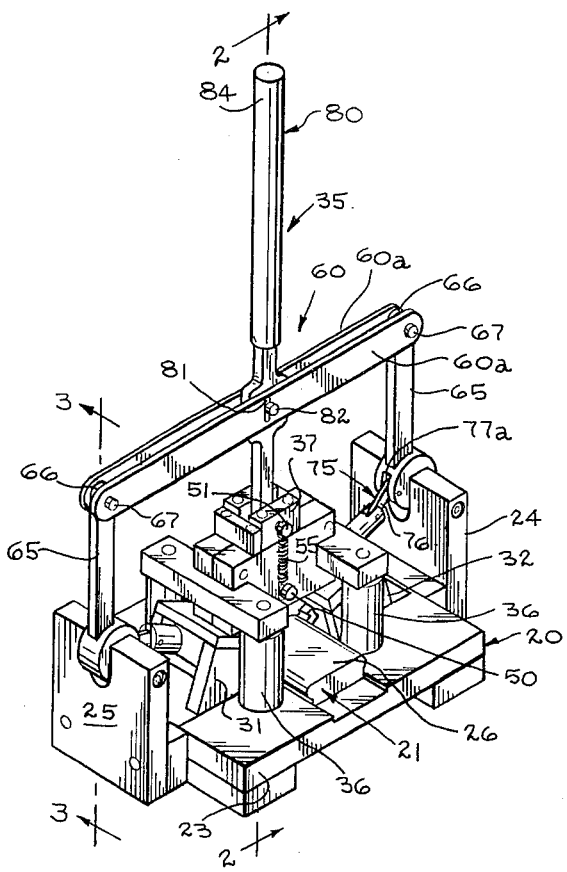
FIG. 1 is an isometric view showing the preferred embodiment of the present invention.

Attention is now directed to FIG. 1 of the drawings wherein support means are illustrated generally by the numeral 20. Mounted on the support means are fixed die means referred to generally at 21 for receiving and supporting a metal strip such as that shown in FIGS. 6 and 7 having a base portion 11 and edge portions 12 and 13.

The support means 20 includes the upwardly extending members 24 and 25 on each side thereof.

Actuating means referred to generally at 35 are supported by the side members 24 and 25, such actuating means serving to actuate and move and cutting die means referred to generally at 45 for cutting the base portion 11 and edge portions 12 and 13 of the metal strip 10 of FIGS. 6 and 7.

Figure 2:
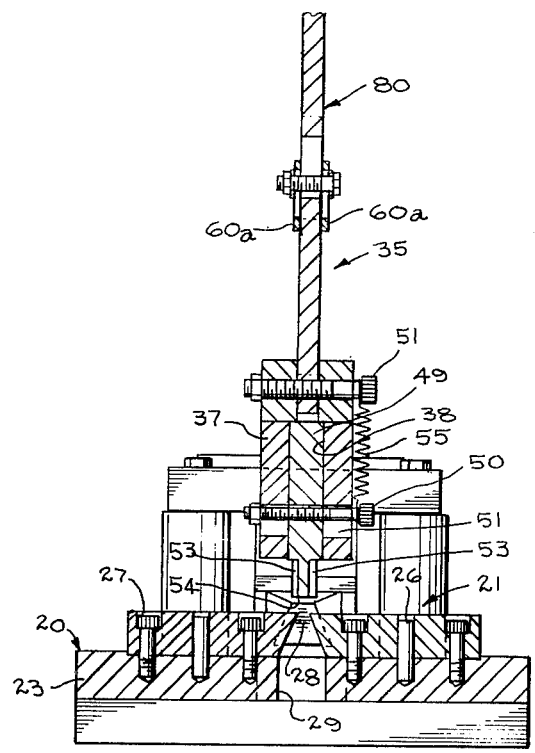
FIG. 2 is a sectional view partly in elevation on the line 2—2 of FIG. 3 of the present invention.

The support means 20 includes a base member 23 for receiving and supporting the fixed die means 21 thereon. As more clearly shown in FIG. 2 the fixed die means 21 includes a pair of dies 26 and 27 mounted on the base member 23 by any suitable means such as screws or bolts or the like which are recessed in the dies in any suitable manner as shown in FIG. 2. It will be noted that the dies 26 and 27 are in aligned, spaced horizontal relationship to form a space 28 therebetween, there being an opening 29 in the base member 23 to provide a means of egress for the metal blank 14 cut from the metal strip as illustrated in FIGS. 6 and 7.

Figure 3:
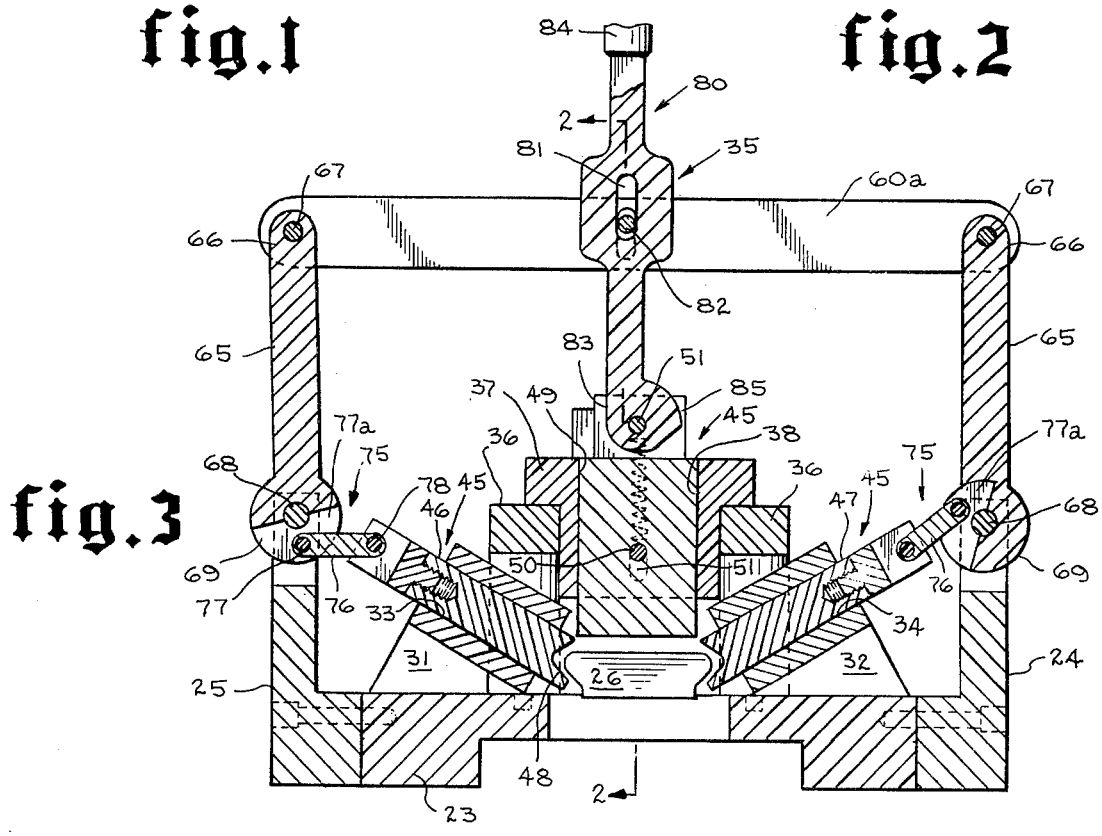
FIG. 3 is a sectional view, partly in elevation on the line 3—3 of FIG. 1.
Figure 4:
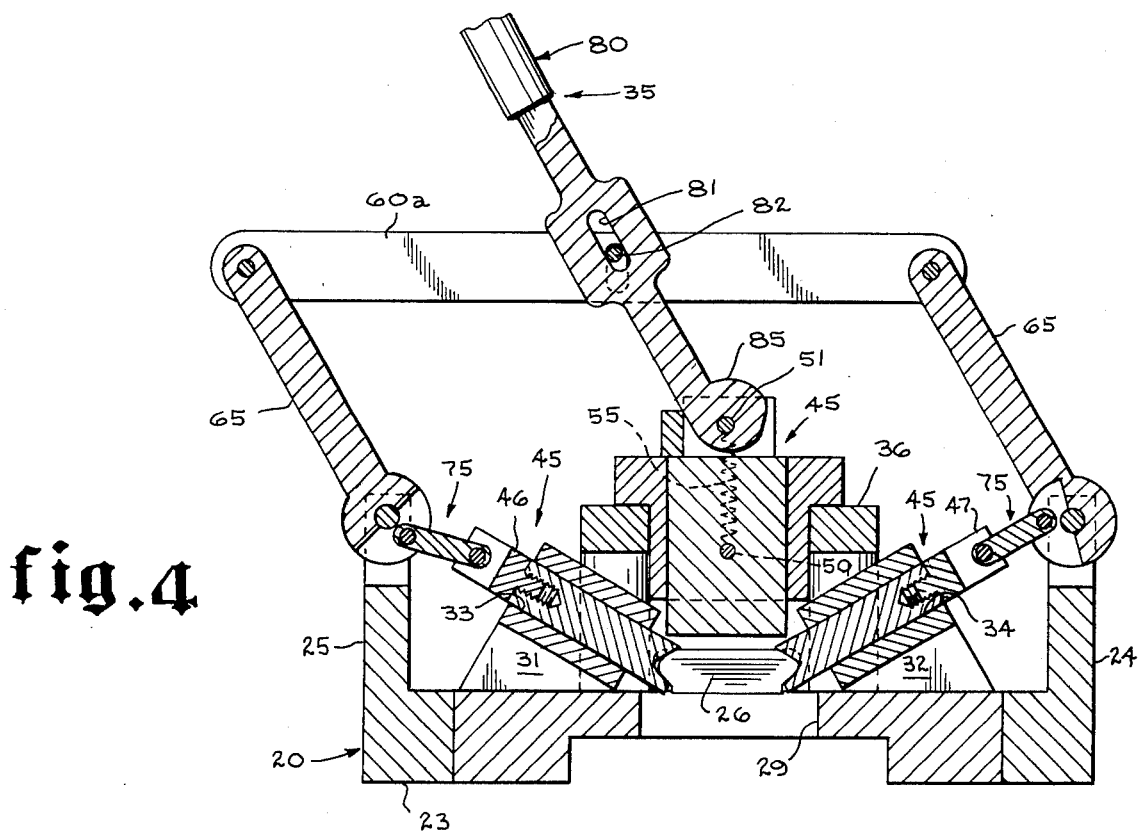
FIG. 4 is a sectional view similar to FIG. 3 illustrating the actuating means in operation so as to move the cutting dies movably mounted on the support means into engagement with a metal strip supported on the fixed dies of the support means for cutting the metal strip edge portions.
Figure 5:
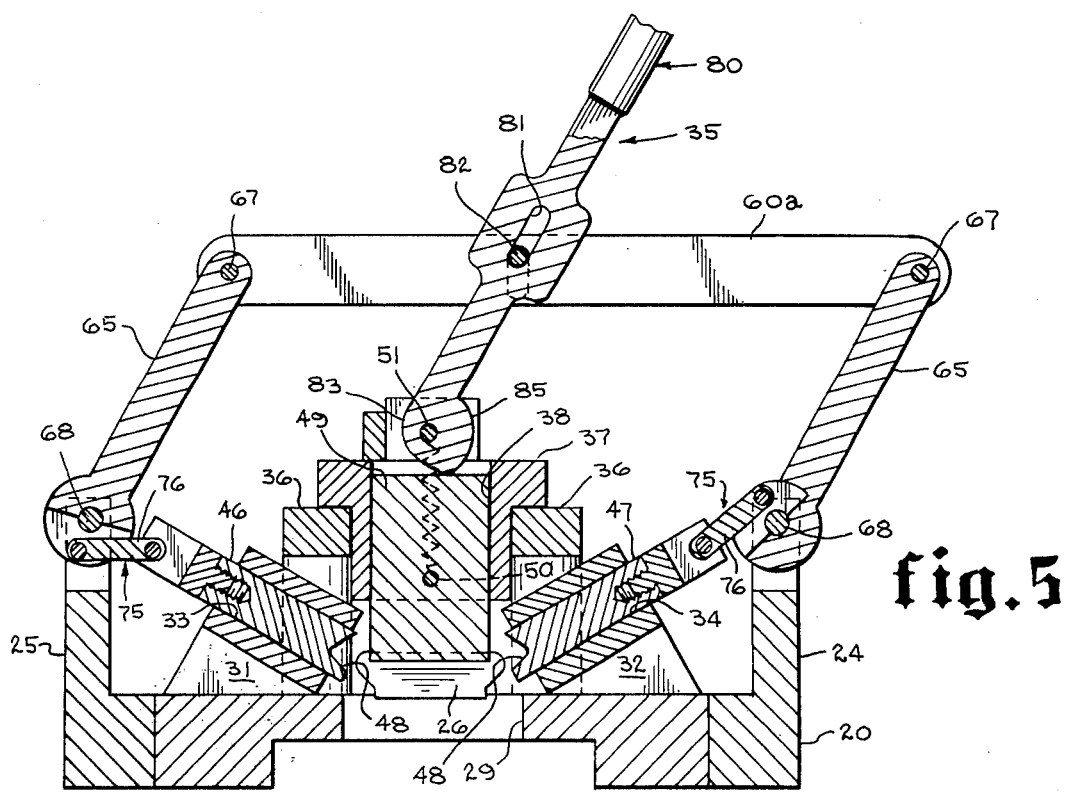
FIG. 5 is a sectional view similar to FIG. 3 but illustrates the actuating means moved in a reverse direction to withdraw the edge portion cutting die means and to move the base portion cutting die means carried by the support means into engagement with the base portion of the metal strip for cutting the metal strip in a manner so that the cut formed on the base portion coincides with the cut formed on the edge portions even though the edge portions extend in multiple different planes from that of the base portion.

A pair of members 31 and 32 is mounted on the base member 23 in opposed relation to each other on each side of the fixed die means 26 and 27 as shown in FIGS. 3, 4 and 5 of the drawings.

Each of the members 31 and 32 are provided with openings 33 and 34 respectively therethrough which are inclined toward and aligned with the space 28 between the fixed dies 26 and 27.

Additional means 36 is mounted on the base member 23 on each side of the dies 26 and 27 and includes a member 37 supported thereby over dies 26, 27 and having an opening 38 extending vertically therethrough which is aligned with the space 28 between the fixed dies 26 and 27.

It will be noted that the cutting die means 45 which are connected with the actuating means 35 are carried in the openings 33, 34 and 38 for engaging with and cutting and forming the metal strip in the desired manner as will be described in greater detail.

The cutting die means 45 include the edge portion cutting dies 46 and 47 which are slidably mounted in the openings 33 and 34 respectively of the means 31 and 32. It will be noted that the edge portion cutting die means 46 and 47 have a cutting forward end 48 for engaging with and cutting the arcuate curved edges 12 and 13 of the metal strip 10 as illustrated in the drawings.

The base portion cutting die 49 is slidably received in the opening 38 formed in the member 37 and is supported therein by means of the pin or bolt 50 which extends through the base portion cutting die 49 and is received within the slot 51 in member 37 which slot is of substantially greater extent than the width of the bolt 50 to accommodate up and down movement of the die 49. In addition, spring means 55 are connected between the bolt 50 and the pin 51 which pivotally connects the actuating means 35 with the base portion cutting die 49 whereby the base portion cutting die 49 normally tends to retract from the space 28 and from engagement with the metal strip 10 to be engaged thereby.

The base portion cutting die 49 includes side cutting surfaces 53 for forming the convex edge portions 15 on the metal strip as shown in FIG. 7 of the drawings as well as the bottom cutting edge 54 on each of the surfaces 53 to further aid in cutting the metal strip base portion 11.

The actuating means 35 includes an elongated shaft means 60, which may be formed by a pair of shafts 60a as shown in FIG. 1 of the drawings.

Shaft members 65 are pivotally secured at one of their ends 66 by suitable means such as the pin 67 to the shafts 60 as shown in the drawings, and the other end of the shaft member 65 is pivotally connected by the pin 68 to the upwardly extending side members 24 and 25 of the support means 20. This arrangement enables the shafts 60a and the shaft members 66 to be rocked or shifted laterally relative to the support means 20 and base member 23 for actuation of the edge portion cutting dies 46 and 47 as well as the base portion cutting die 49 as will be described.

The shaft 65 includes the enlargement 69 adjacent the pivot connection 68 to the support means 20 whereby eccentric means referred to generally at 75 may be connected between the shaft members 65 and the edge portion cutting dies 46 and 47 so as to effect movement of the edge portion cutting dies 46, 47 into engagement with the metal strip 10 to effect cutting of the edge portions 12 and 13 thereof as shown in FIG. 4, and then retract the edge portion cutting dies 46 and 47 as shown in FIG. 5 of the drawings while base portion die 49 is moved to cut base portion 11 of the metal strip 10.

The eccentric means 75 includes a shaft 76 pivotally secured at 77 in slot 77a formed in enlargement 69 and off center of the enlargement 69 which shaft is also pivotally secured as shown at 78 to the end of the edge portion cutting dies 46 and 47 as shown in FIGS. 3, 4 and 5 of the drawings.

The actuating means 35 also includes the lever means referred to generally at 80 which is connected to the elongated shafts 60a by means of the slot 81 in the lever means 80 with which is engaged the pin 82 extending through the shafts 60a and the slot 81.

One end 83 of the shaft 80 is pivotally connected by means of the pin 51 to the top of the base portion cutting die 49 as shown in FIGS. 3–5 inclusive of the drawings and the other end 84 extends outwardly of the elongated shafts 60a whereby the lever means 80 may be manually grasped to effect movement of the actuating means 35 and the cutting die means 46, 47, 49 connected therewith.

The end 83 of the lever means 80 includes a surface 85 which is eccentric relative to the pivot pin 51 so that such eccentric surface 85 may be engaged with the upper end of the base portion cutting die 49 to effect downward movement thereof into cutting engagement with the base portion 11 of the metal strip 10 as will be described.

In operation of the present invention, the metal strip 10 having the general configuration as shown in FIGS. 6 and 7 may be positioned on the fixed dies 26 and 27 and over the space 28 when the actuating means is in the position shown in FIGS. 1–3 of the drawings.

Thereafter, by moving the lever 80 to the left as viewed in FIG. 4, it will be noted that the shafts 60a as well as the shaft members 65 are shifted or rocked laterally of the base member 23 to cause the eccentric 75 connected with the edge portion cutting dies 46 and 47 to move in a direction so that the edge portion cutting dies 46 and 47 are moved inwardly to contact the edges 12 and 13 of the metal strip 10 and effect cutting thereof as represented at 18 and 19 in FIG. 6 of the drawings.

Thereafter, when the lever 80 is moved in a reverse direction laterally of the support 20, the pin 82 moves in slot 81 and the eccentric means 75 withdraws from the edge portion cutting dies 46 and 47 while at the same time engaging the eccentric surface 85 on the lever means 80 with the upper end of the base portion cutting die 49 to move it down against the force of the spring 55 so that it engages the base portion 11 of the metal strip 10 and forms a cut therein as represented at 90 in FIG. 7.

It will be noted that the relationship of the edge portion cutting dies 46 and 47 to the base portion cutting die 49, as well as their cutting surfaces, is such that a smooth, continuous cut is formed in the metal strip 10 and a convex edge 15 is provided or formed by reason of the base portion cutting die 49 and its configuration. It will also be noted that the edge portion cutting dies 46 and 47 are provided with a cutting face 48 which coincides with the edge of the cutting surfaces 53 and 54 of the base portion cutting die 49, but which is in a receding direction relative to the convex edge 15 on the base portion 11.

After the cut has been formed, then the metal strip 10 may be moved through the apparatus by sliding it on the fixed dies 26 and 27 until a suitable length has been reached which is desired, whereupon the cutting operation may be repeated.

The foregoing disclosure and description of the invention are illustrative and explanatory thereof, and various changes in the size, shape, and materials as well as in the details of the illustrated construction may be made without departing from the spirit of the invention.

What is claimed is:

1. An apparatus for cutting in a single pass a metal strip having a flat base portion with edge portions extending from the base portion in planes different from that of the base portion comprising:
   a. support means;
   b. fixed die means mounted on said support means for receiving and supporting the metal strip having a flat base with edge portions extending from the base portion in a plane different from that of the base portion;
   c. cutting die means movably carried by said support means to cut the base portion and the edge portions in a single pass;
   d. said fixed die means including a pair of fixed dies in aligned, spaced, horizontal relationship to provide a space for receiving said cutting die means therebetween when actuated;
   e. actuating means carried by said support means and connected to said cutting die means for effecting movement thereof to cut the edge portions and the base portion of the metal strip;
   f. said support means including:
      1. a base member for receiving and supporting said pair of fixed dies in said aligned, spaced, horizontal relationship;
      2. a pair of members mounted on said base member in opposed relation to each other on each side of said fixed die means, with each of said members having an opening inclined toward and aligned with the space between said pair of fixed dies; and
      3. additional means mounted on said base member and having an opening vertically aligned with the space between said pair of fixed dies;
   g. said cutting die means being slidably positioned in the openings in said pair of members to form the edge portion cutting dies and said cutting die means being slidably positioned in the opening in said additional means to form the base portion cutting die;
   h. said actuating means carried by said support means and connected to said cutting die means including:
      1. elongated shaft means;
      2. shaft members pivotally secured at one end to said elongated shaft means and at their other end to said support means whereby said elongated shaft means and shaft members may be rocked laterally relative to said support means;
      3. eccentric means pivotally connected to said other end of said shaft members and to said edge portion cutting dies slidably positioned in said pair of members;
      4. lever means connected to said elongated shaft means and having one end pivotally connected to said additional means and an other end extending away from said elongated shaft means whereby said elongated shaft means and pivotally connected shaft members may be rocked by said lever means;
      5. said one end of said lever means having a surface eccentric to said pivotal connection between said lever means and additional means, said eccentric surface being engagable with the base portion cutting die;
      6. said lever means movable in one direction laterally of said support means to move said shaft members, eccentric means and edge portion cutting dies connected therewith into the space between said aligned, horizontal pair of dies to cut the edge portions of the metal strip and said lever means movable in the other direction laterally of said support means to engage said eccentric surface with and move said base portion die supported in said additional means into the space between said aligned, horizontal pair of dies to cut the base portion of the metal strip;
   i. said base portion cutting die being supported in said additional means by spring means which normally tend to retract said base portion cutting die away from said fixed die means;
   j. said base portion cutting die being shaped to cut the metal strip base portion to form a convex edge thereon; and
   k. said edge portion cutting dies being shaped to cut the metal strip edge portions at a receding angle relative to the convex edge on the base portion of the metal strip.

* * * * *